United States Patent
Deghel et al.

(10) Patent No.: US 11,882,429 B2
(45) Date of Patent: Jan. 23, 2024

(54) UPLINK RESOURCE DETERMINATION APPARATUS, METHOD AND COMPUTER PROGRAM

(71) Applicant: Nokia Technologies Oy, Espoo (FI)

(72) Inventors: Matha Deghel, Paris (FR); Anna Pantelidou, Massy (FR); Philippe Sehier, Saint Germain en Laye (FR)

(73) Assignee: Nokia Technologies Oy, Espoo (FI)

( * ) Notice: Subject to any disclaimer, the term of this patent is extended or adjusted under 35 U.S.C. 154(b) by 368 days.

(21) Appl. No.: 17/415,035

(22) PCT Filed: Dec. 21, 2018

(86) PCT No.: PCT/EP2018/086715
§ 371 (c)(1),
(2) Date: Jun. 17, 2021

(87) PCT Pub. No.: WO2020/126047
PCT Pub. Date: Jun. 25, 2020

(65) Prior Publication Data
US 2022/0070854 A1    Mar. 3, 2022

(51) Int. Cl.
*H04W 72/51*    (2023.01)
*H04W 72/0446*    (2023.01)
*H04W 72/0453*    (2023.01)
*H04W 72/21*    (2023.01)

(52) U.S. Cl.
CPC ....... *H04W 72/51* (2023.01); *H04W 72/0446* (2013.01); *H04W 72/0453* (2013.01); *H04W 72/21* (2023.01)

(58) Field of Classification Search
CPC ............. H04W 72/51; H04W 72/0446; H04W 72/0453; H04W 72/21; H04W 72/1268
See application file for complete search history.

(56) References Cited

U.S. PATENT DOCUMENTS

| | | | |
|---|---|---|---|
| 2006/0133331 A1* | 6/2006 | Jhamnani | H04W 72/1268 370/465 |
| 2014/0274079 A1 | 9/2014 | Li et al. | 455/450 |
| 2017/0238314 A1 | 8/2017 | Zhang et al. | 72/406 |

(Continued)

FOREIGN PATENT DOCUMENTS

| | | |
|---|---|---|
| CN | 101675608 A | 3/2010 |
| CN | 107548044 A | 1/2018 |

(Continued)

OTHER PUBLICATIONS

"3rd Generation Partnership Project; Technical Specification Group Radio Access Network; NR; Physical layer procedures for data (Release 15)", 3GPP TS 38.214, V15.2.0, Jun. 2018, pp. 1-95.

(Continued)

*Primary Examiner* — Afshawn M Towfighi
(74) *Attorney, Agent, or Firm* — Harrington & Smith

(57) ABSTRACT

There is provided an apparatus, said apparatus comprising means for determining for at least one of a plurality of user equipments, based on an activation probability value of some or all of the plurality of user equipments, uplink resources for use by the at least one user equipment; and providing an indication of the determined uplink resources to the at least one user equipment.

15 Claims, 9 Drawing Sheets

(56) References Cited

U.S. PATENT DOCUMENTS

| | | | | |
|---|---|---|---|---|
| 2018/0167916 | A1 | 6/2018 | Zhang et al. | ............... 72/42 |
| 2019/0029045 | A1* | 1/2019 | Li | ............ H04W 74/0808 |
| 2020/0100257 | A1* | 3/2020 | Yang | ............... H04W 76/20 |
| 2022/0046615 | A1* | 2/2022 | Park | ............... H04L 5/0094 |

FOREIGN PATENT DOCUMENTS

| | | |
|---|---|---|
| EP | 2882249 A1 | 6/2015 |
| GB | 2413243 A | 10/2005 |

OTHER PUBLICATIONS

"3rd Generation Partnership Project; Technical Specification Group Services and System Aspects; System Architecture for the 5G System; Stage 2 (Release 15)", 3GPP TS 23.501, V15.2.0, Jun. 2018, pp. 1-217.

"3rd Generation Partnership Project; Technical Specification Group Radio Access Network; NR; Medium Access Control (MAC) protocol specification (Release 15)", 3GPP TS 38.321, V15.2.0, Jun. 2018, pp. 1-73.

"3rd Generation Partnership Project; Technical Specification Group Radio Access Network; NR; Radio Resource Control (RRC) protocol specification (Release 15)", 3GPP TS 38.331, V15.2.1, Jun. 2018, pp. 1-303.

Singh et al., "Contention-Based Access for Ultra-Reliable Low Latency Uplink Transmissions", IEEE Wireless Communications Letters, vol. 7, No. 2, Apr. 2018, pp. 182-185.

Kotaba et al., "Uplink Transmissions in URLLC Systems with Shared Diversity Resources", IEEE Wireless Communications Letters, vol. 7, No. 4, Aug. 2018, pp. 590-593.

Pratas et al., "Code-expanded random access for machine-type communications", IEEE Globecom Workshops, Dec. 3-7, 2012, pp. 1681-1686.

International Search Report and Written Opinion received for corresponding Patent Cooperation Treaty Application No. PCT/EP2018/086715, dated Jul. 17, 2019, 11 pages.

* cited by examiner

Figure 6

T1: Receiving, at a user equipment in a plurality of user equipments, an indication from a base station of determined uplink resources for use by the user equipment, the uplink resources determined based on an activation probability value of some or all of the plurality of user equipments

UPLINK RESOURCE DETERMINATION APPARATUS, METHOD AND COMPUTER PROGRAM

RELATED APPLICATION

This application was originally filed as PCT Application No. PCT/EP2018/086715, filed on Dec. 21, 2018, of which is incorporated herein by reference in its entirety.

FIELD

The present application relates to a method, apparatus, system and computer program and in particular but not exclusively to resource allocation strategy for uplink grant-free ultra-reliable low latency communication (URLLC).

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia, content data, time-sensitive network (TSN) flows and/or data in an industrial application such as critical system messages between an actuator and a controller, critical sensor data (such as measurements, video feed etc.) towards a control system and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G system (5GS) including the 5G or next generation core (NGC) and the 5G access network based on the New Radio (NR) radio-access technology. 5GS including NR are being standardized by the 3rd Generation Partnership Project (3GPP).

SUMMARY

In a first aspect there is provided an apparatus, said apparatus comprising means for determining for at least one of a plurality of user equipments, based on an activation probability value of some or all of the plurality of user equipments, uplink resources for use by the at least one user equipment and providing an indication of the determined uplink resources to the at least one user equipment.

The activation probability value may define a probability of the user equipment causing data transmission.

The activation probability value may be a predetermined value.

The apparatus may comprise means for providing an indication to the at least one user equipment to cause the at least one user equipment to determine the activation probability of the at least one user equipment and receiving an indication of the activation probability from the at least one user equipment.

The indication to cause the at least one user equipment to determine the activation probability of the at least one user equipment may comprise a time period. The activation probability value may be a ratio of a time for data transmission in the time period to the time period.

The indication of the determined uplink resources may comprises an index associated with the determined uplink resources.

The indication of the determined uplink resources may comprise time and frequency domain allocations.

In a second aspect, there is provided an apparatus comprising means for receiving, at a user equipment in a plurality of user equipments, an indication from a base station of determined uplink resources for use by the user equipment, the uplink resources determined based on an activation probability value of some or all of the plurality of user equipments.

The activation probability value may define a probability of the user equipment causing data transmission.

The activation probability value may be a predetermined value.

The apparatus may comprise means for receiving an indication from the base station to cause the user equipment to determine the activation probability of the user equipment, determining the activation probability of the user equipment and providing an indication of the determined activation probability to the base station.

The indication to cause the user equipment to determine the activation probability of the user equipment may comprise a time period. The activation probability value may be a ratio of a time for data transmission in the time period to the time period.

The indication of the determined uplink resources may comprise an index associated with the determined uplink resources.

The indication of the determined uplink resources may comprise time and frequency domain allocations.

In a third aspect there is provided a method comprising determining for at least one of a plurality of user equipments, based on an activation probability value of some or all of the plurality of user equipments, uplink resources for use by the at least one user equipment and providing an indication of the determined uplink resources to the at least one user equipment. The activation probability value may define a probability of the user equipment causing data transmission.

The activation probability value may be a predetermined value.

The method may comprise providing an indication to the at least one user equipment to cause the at least one user equipment to determine the activation probability of the at least one user equipment and receiving an indication of the activation probability from the at least one user equipment.

The indication to cause the at least one user equipment to determine the activation probability of the at least one user equipment may comprise a time period. The activation probability value may be a ratio of a time for data transmission in the time period to the time period.

The indication of the determined uplink resources may comprises an index associated with the determined uplink resources.

The indication of the determined uplink resources may comprise time and frequency domain allocations.

In a fourth aspect there is provided a method comprising receiving, at a user equipment in a plurality of user equipments, an indication from a base station of determined uplink resources for use by the user equipment, the uplink resources determined based on an activation probability value of some or all of the plurality of user equipments.

The activation probability value may define a probability of the user equipment causing data transmission.

The activation probability value may be a predetermined value.

The method may comprise receiving an indication from the base station to cause the user equipment to determine the activation probability of the user equipment, determining the activation probability of the user equipment and providing an indication of the determined activation probability to the base station.

The indication to cause the user equipment to determine the activation probability of the user equipment may comprise a time period. The activation probability value may be a ratio of a time for data transmission in the time period to the time period.

The indication of the determined uplink resources may comprise an index associated with the determined uplink resources.

The indication of the determined uplink resources may comprise time and frequency domain allocations.

In a fifth aspect there is provided an apparatus comprising: at least one processor and at least one memory including a computer program code, the at least one memory and computer program code configured to, with the at least one processor, cause the apparatus at least to: determine for at least one of a plurality of user equipments, based on an activation probability value of some or all of the plurality of user equipments, uplink resources for use by the at least one user equipment and provide an indication of the determined uplink resources to the at least one user equipment.

The activation probability value may define a probability of the user equipment causing data transmission.

The activation probability value may be a predetermined value.

The apparatus may be configured to provide an indication to the at least one user equipment to cause the at least one user equipment to determine the activation probability of the at least one user equipment and receive an indication of the activation probability from the at least one user equipment.

The indication to cause the at least one user equipment to determine the activation probability of the at least one user equipment may comprise a time period. The activation probability value may be a ratio of a time for data transmission in the time period to the time period.

The indication of the determined uplink resources may comprises an index associated with the determined uplink resources.

The indication of the determined uplink resources may comprise time and frequency domain allocations.

In a sixth aspect there is provided an apparatus comprising: at least one processor and at least one memory including a computer program code, the at least one memory and computer program code configured to, with the at least one processor, cause the apparatus at least to: receive, at a user equipment in a plurality of user equipments, an indication from a base station of determined uplink resources for use by the user equipment, the uplink resources determined based on an activation probability value of some or all of the plurality of user equipments.

The activation probability value may define a probability of the user equipment causing data transmission.

The activation probability value may be a predetermined value.

The apparatus may be configured to perform receiving an indication from the base station to cause the user equipment to determine the activation probability of the user equipment, determine the activation probability of the user equipment and provide an indication of the determined activation probability to the base station.

The indication to cause the user equipment to determine the activation probability of the user equipment may comprise a time period. The activation probability value may be a ratio of a time for data transmission in the time period to the time period.

The indication of the determined uplink resources may comprise an index associated with the determined uplink resources.

The indication of the determined uplink resources may comprise time and frequency domain allocations.

In a seventh aspect there is provided a computer readable medium comprising program instructions for causing an apparatus to perform at least the following determining for at least one of a plurality of user equipments, based on an activation probability value of some or all of the plurality of user equipments, uplink resources for use by the at least one user equipment and providing an indication of the determined uplink resources to the at least one user equipment.

The activation probability value may define a probability of the user equipment causing data transmission.

The activation probability value may be a predetermined value.

The apparatus may be caused to perform providing an indication to the at least one user equipment to cause the at least one user equipment to determine the activation probability of the at least one user equipment and receiving an indication of the activation probability from the at least one user equipment.

The indication to cause the at least one user equipment to determine the activation probability of the at least one user equipment may comprise a time period. The activation probability value may be a ratio of a time for data transmission in the time period to the time period.

The indication of the determined uplink resources may comprises an index associated with the determined uplink resources.

The indication of the determined uplink resources may comprise time and frequency domain allocations.

In an eighth aspect there is provided a computer readable medium comprising program instructions for causing an apparatus to perform at least the following receiving, at a user equipment in a plurality of user equipments, an indication from a base station of determined uplink resources for use by the user equipment, the uplink resources determined based on an activation probability value of some or all of the plurality of user equipments.

The activation probability value may define a probability of the user equipment causing data transmission.

The activation probability value may be a predetermined value.

The apparatus may be caused to perform receiving an indication from the base station to cause the user equipment to determine the activation probability of the user equipment, determining the activation probability of the user equipment and providing an indication of the determined activation probability to the base station.

The indication to cause the user equipment to determine the activation probability of the user equipment may comprise a time period. The activation probability value may be a ratio of a time for data transmission in the time period to the time period.

The indication of the determined uplink resources may comprise an index associated with the determined uplink resources.

The indication of the determined uplink resources may comprise time and frequency domain allocations.

In a ninth aspect there is provided a non-transitory computer readable medium comprising program instructions for causing an apparatus to perform a method according to the third or fourth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 6 shows a flowchart of a method according to an example embodiment;

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
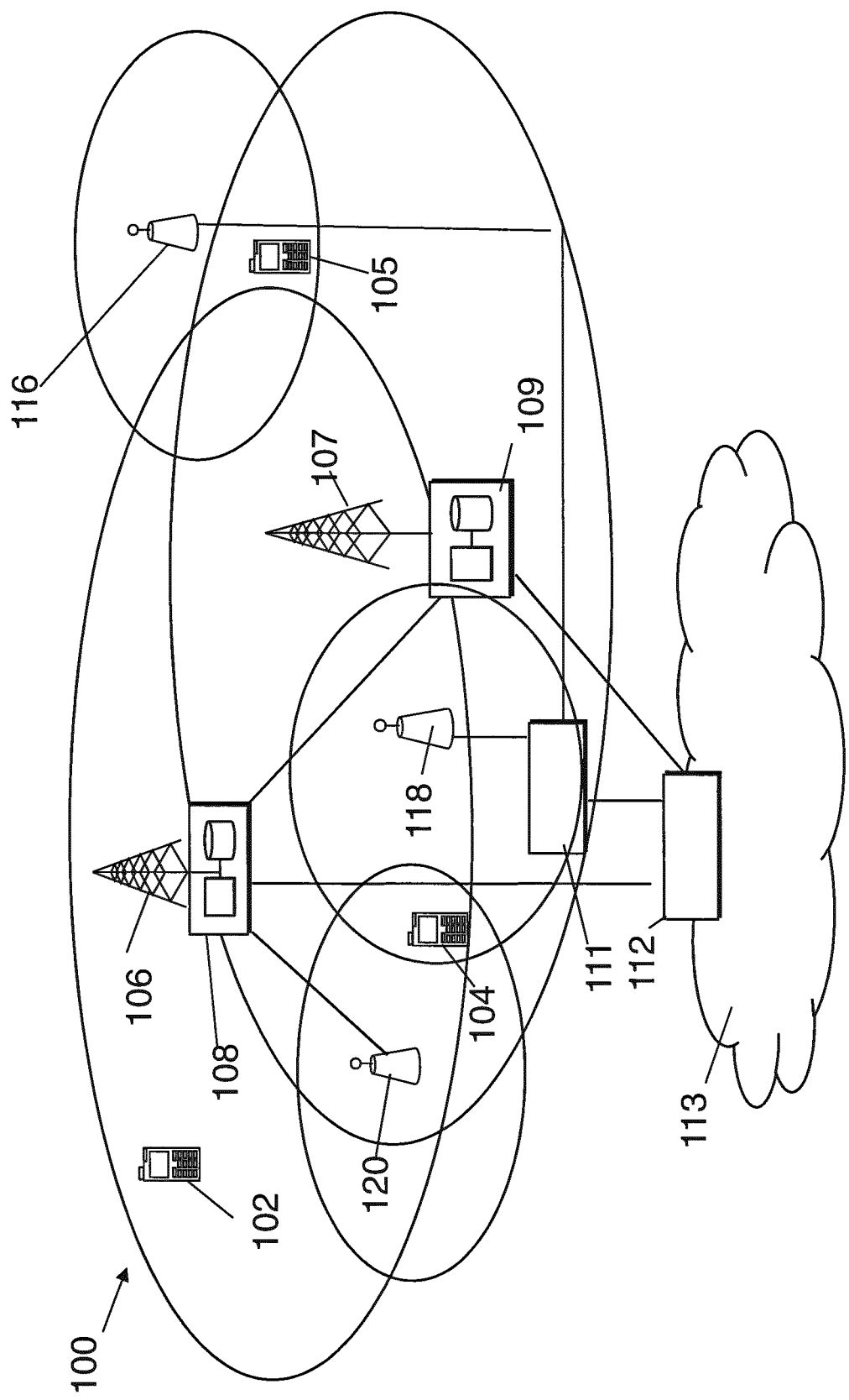
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point.

Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatuses. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

An example 5G core network (CN) comprises functional entities. The CN is connected to a UE via the radio access network (RAN). An UPF (User Plane Function) whose role is called PSA (PDU Session Anchor) may be responsible for forwarding frames back and forth between the DN (data network) and the tunnels established over the 5G towards the UE(s) exchanging traffic with the DN.

The UPF is controlled by an SMF (Session Management Function) that receives policies from a PCF (Policy Control Function). The CN may also include an AMF (Access & Mobility Function).

Figure 2:
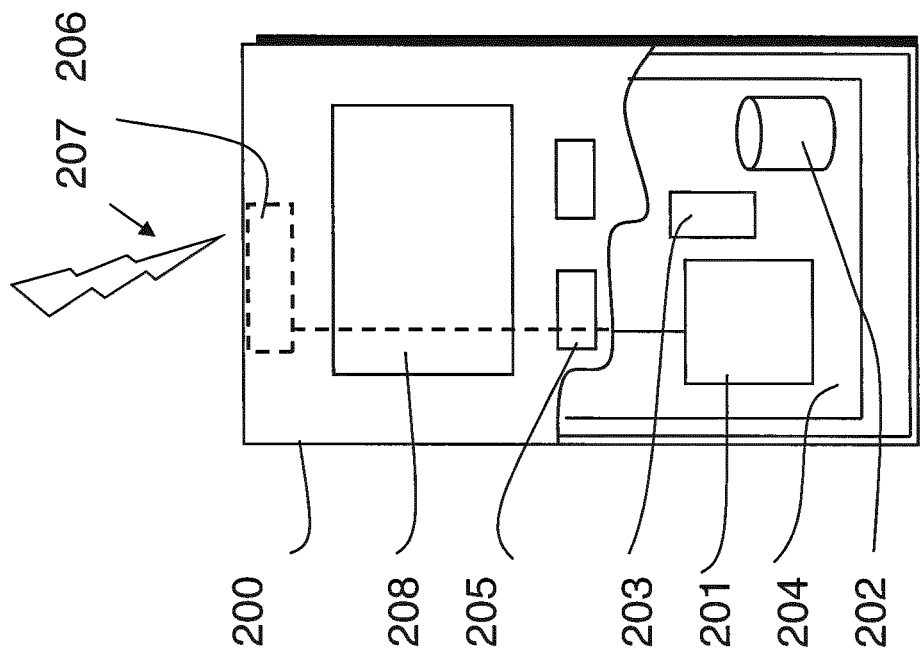
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
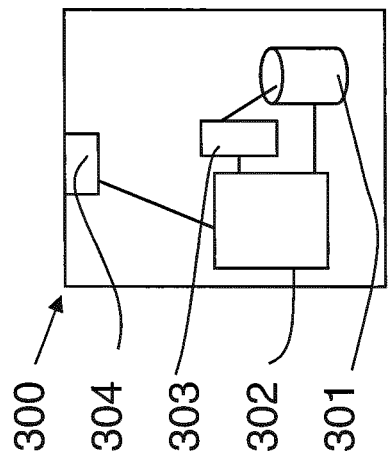
FIG. 3 shows a schematic diagram of an example control apparatus.

FIG. 3 shows an example of a control apparatus for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

Ultra-Reliable Low Latency Communications (URLLC) is a feature of 5G that may enable support of emerging applications in different verticals beyond conventional telecommunication services. The targeted use cases of URLLC include various delay-sensitive applications such as tactile internet, autonomous driving, and smart factories. The first industrial standard of 5G communications, namely 3GPP Release-15, introduces several enhancements across multiple radio access networks (RAN) protocol layers in a bid to meet the challenging goals of URLLC.

In NR Rel-15, a general URLLC reliability requirement may be 99.999% with a latency of 1 ms for short packets.

Grant-free transmission may achieve low latency in uplink. Under this approach, both issuing a scheduling request and waiting for a scheduling grant are skipped which may provide fast uplink (UL) access results. To further reduce the latency, the TTI (transmission time interval) length may be decreased. Conversely, to improve reliability performance without penalizing latency, it has been proposed to use transmission diversity, under which the UE sends multiple packet replicas (i.e., copies) without waiting for the acknowledgements.

Grant-free URLLC uplink transmissions are made on a pre-defined block of time-frequency resources. That is, the URLLC UEs do not have dedicated resources and share a common resource pool over which they make their transmissions (i.e., send their packet replicas). The URLLC resource pool repeats in time according to a certain pre-configured periodicity.

Figure 4:
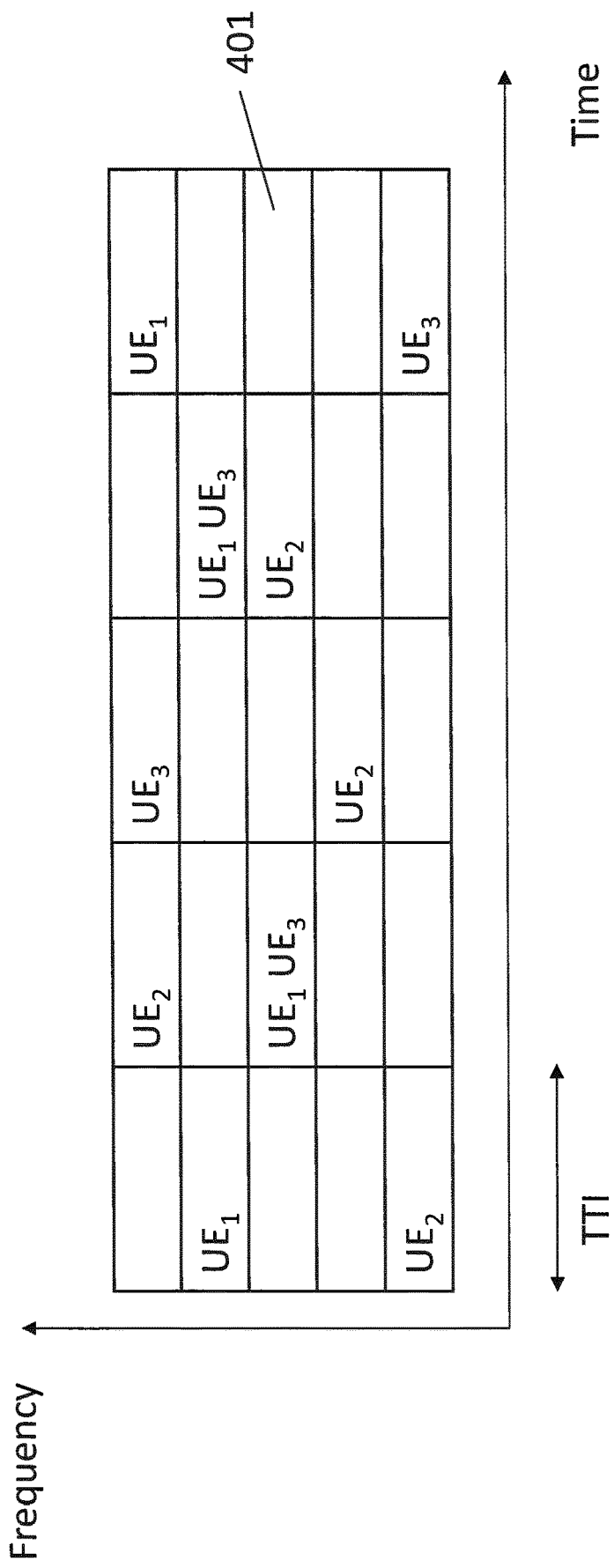
FIG. 4 shows a schematic diagram of an example resource pool structure.

FIG. 4 illustrates an example of such a resource pool with 5 TTIs and 5 resource units (RUs) 401 per TTI; so in total there are 25 RUs 401 in this example resource pool. In the example shown in FIG. 4 there are three active UEs and the number of packet replicas is four.

As shown in FIG. 4, each UE uses a subset of RUs 401 from the URLLC resource pool for the transmission of its packet replicas. The gNB decodes the received packets by using a successive interference cancellation (SIC) receiver over multiple TTIs. The subset of RUs 401 used by a UE to send its packet replicas may be referred to as a 'resource sequence' (or 'sequence').

In current specifications, there are two types of uplink transmission without dynamic grant.

In configured grant Type 1, an uplink grant is provided by RRC, and stored as configured uplink grant.

In configured grant Type 2, an uplink grant is provided by the physical downlink control channel (PDCCH), and stored or cleared as configured uplink grant based on L1 signalling indicating configured uplink grant activation or deactivation.

Configured grant Type 1 and Type 2 are configured by RRC per Serving Cell and per bandwidth part (BWP).

For both type 1 and type 2, the gNB (by configuration) provides each UE with time and frequency resources available for transmissions. In other words, the gNB configures the time instances as well as the frequency-domain resources for each UE independently.

URLLC traffic may be periodic or non-periodic. In the periodic case the traffic arrives at the UE according to a certain periodicity, whereas for the non-periodic case the traffic arrival may be sporadic and unpredictable.

For the non-periodic case, the activation probability of each UE may affect the efficiency of resource allocation for these UEs. The activation probability of a UE represents the probability that this UE has data to transmit. The activation probability may not be captured in any parameter available at the gNB. The activation probability may not be identical for all the UEs.

It has been proposed to send packet replicas in consecutive TTIs, where the RUs used for the transmission of these replicas are randomly selected by the UE. Using this approach, the gNB does not know in advance the RUs that are selected by each active UE. This may make detection and decoding at the gNB more challenging. In addition, the resource allocation for any UE may not account for the activation probabilities of UEs.

An uplink transmission scheme has been proposed in which the URLLC resource pool is split into dedicated and shared parts. Over the dedicated part, no collisions occur since UEs are allocated dedicated resources. In the shared part, two or multiple UEs can share the same RU, which may lead to collisions. However, how to allocate the shared part of the URLLC resource pool among the UEs has not been discussed, and activation probabilities are not taken into account in this proposal.

The following addresses how to allocate resources to account for whether or not a UE has data to transmit, and to achieve the URLLC requirements. In other words, the following may provide a design for the resource sequences for the UEs so that the packet error probability is kept as low as possible and the packet delay doesn't exceed the latency budget.

Figure 5:
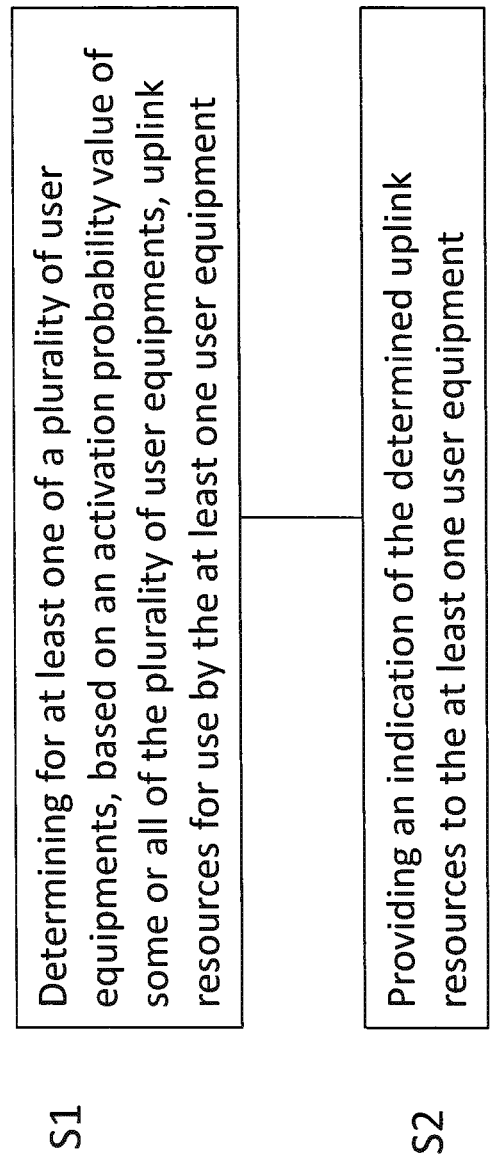
FIG. 5 shows a flowchart of a method according to an example embodiment.

FIG. 5 shows a method according to an example embodiment. In a first step, S1, the method comprises determining for at least one of a plurality of user equipments, based on an activation probability value of some or all of the plurality of user equipments, uplink resources for use by the at least one user equipment.

In a second step, S2, the method comprises providing an indication of the determined uplink resources to the at least one user equipment.

The method may be performed at a base station, e.g., a gNB.

FIG. 6 shows a method according to an example embodiment. In a first step, T1, the method comprises receiving, at a user equipment in a plurality of user equipments, an indication from a base station of determined uplink resources for use by the user equipment, the uplink resources determined based on an activation probability value of some or all of the plurality of user equipments.

The determined uplink resources may be referred to as a resource sequence.

Some of the plurality of user equipments may be one or more of the plurality of user equipments.

In an example embodiment, based on the activation probabilities of the UEs, the gNB allocates the resource sequences. Each UE may be allocated a unique sequence. The resource sequence indicates the RUs the UE should use when it causes data transmission (i.e. sends packet replicas).

The resource sequences are pre-assigned in the sense that the gNB calculates them and then signals them to the UEs.

One way of signaling a sequence is by sending the index of the resource sequence, in which case the gNB and the UEs should agree on some predefined codebook of resource sequences. Alternatively, or in addition, the base station may send the corresponding time- and frequency-domain allocations of the resource sequence. That is, the indication of the determined uplink resources may comprise an index associated with the determined uplink resources or time and frequency domain allocation.

If the activation probability of any of the plurality of UEs changes beyond a threshold, then the method takes this change into account to update a subsequent sequence. The subsequent sequence may then be signaled to the UE. This may provide an adaptation of the allocation of resources to the activity profiles of the UEs. Updating a UE's resource sequence may cause other UEs' sequences to be updated.

To determine a resource sequence, Hamming distance may be adopted as a similarity measure and a brute-force search approach used. This approach comprises:
a) Initializing the result set with a sequence and associating it with a UE (or equivalently, with an activation probability).
b) Adding to this set any of the sequences that satisfy some similarity constraints with respect to the sequences that are already in the result set, while taking into account the activation probabilities that are associated with the latter sequences. The constraints here should be chosen in such a way as to ensure that the result set contains sequences that are sufficiently distant from each other.
c) Associating the added sequence with a (different) UE.
d) Repeating steps b) and c) until the number of sequences in the result set is equal to the number of UEs.

For example, consider a system with N URLLC UEs and with a resource pool containing K RUs. This pool may be represented by a matrix where the product of the number of rows and the number of columns is equal to K; or more generally, this pool can be represented by a vector of length K.

A resource sequence represents the subset of RUs that are used for transmitting the packet replicas. Considering the example in FIG. 4, an example of a resource sequence is:

$$\begin{pmatrix} 0 & 0 & 0 & 1 & 0 \\ 1 & 0 & 0 & 0 & 0 \\ 0 & 1 & 0 & 0 & 0 \\ 0 & 0 & 0 & 0 & 0 \\ 0 & 0 & 0 & 0 & 1 \end{pmatrix}$$

Packet replicas may be sent in different TTIs so that maximum energy is accumulated if the gNB combines these replicas. Also, to benefit from frequency diversity, frequency hopping may be used, i.e. packet replicas may be sent on different frequency resources.

In this case, the set of all possible sequences may be obtained by considering all the possible combinations of choosing the RUs such that, for any sequence, the replicas are sent in different TTIs and on different frequency resources. The resulting set may be denoted by S.

In the following, an example approach that the gNB uses to find the set of resource sequences to assign to the UEs is described. Alternative approaches may be adopted to determine the sequences. The proposed approach may be simple yet efficient.

Let $d(S_i, S_j)$ represent the Hamming distance between sequence $S_i$ and sequence $S_j$. This distance is used as a similarity measure, and it represents the number of positions at which the corresponding sequences are different. As an example for $$S_i = \begin{pmatrix} 0 & 0 & 0 & 1 & 0 \\ 1 & 0 & 0 & 0 & 0 \\ 0 & 1 & 0 & 0 & 0 \\ 0 & 0 & 0 & 0 & 0 \\ 0 & 0 & 0 & 0 & 1 \end{pmatrix}, S_j = \begin{pmatrix} 1 & 0 & 0 & 0 & 0 \\ 0 & 0 & 1 & 0 & 0 \\ 0 & 1 & 0 & 0 & 0 \\ 0 & 0 & 0 & 0 & 1 \\ 0 & 0 & 0 & 0 & 0 \end{pmatrix},$$

then $d(S_i, S_j)=6$.

The activation probabilities are denoted by $q_1, q_2, \ldots, q_N$, such that $q_1 >= q_2 >= \ldots >= q_N$. Note that $q_n$ doesn't necessarily represent the activation probability of UE n, but more generally represents the activation probability of one of the (N) UEs.

The term 'result set' is used to denote the subset of resource sequences that will be assigned to the UEs. This set will thus have a cardinality equal to N. This set is denoted by RS.

Using its knowledge of the activation probabilities, the gNB adopts the following approach to construct the result set:
1) Initialize the result set with any sequence (from the set of all available sequences, S) and associate the UE with the highest activation probability (given here by $q_1$) to this sequence. Denote this sequence by $S_1^*$.
2) For n=2 to N
   From all the remaining sequences and activation probabilities, add to the result set the sequence that satisfies the following constraints:
   a)

$$\text{argmax}\_\{S \text{ in } S\backslash RS\}\left(\sum_{j=1}^{n-1} q_j d(S, S_j^*)\right),$$

where S\RS stands for the set of elements in S but not in RS.
   The above constraint means that the selected sequence should yield the maximum sum of weighted Hamming distances from the sequences that are already in the result set, where the weights are the activation probabilities that are associated with these latter sequences.
   b) $\min\_\{j=1, \ldots, n-1\}$ $(q_j d(S, S_j^*)) > w$, where S results from a). In other words, the minimum weighted Hamming distance of the selected sequence with respect to each sequence in the result set should be greater than a given threshold.

Denote the selected sequence as $S_n^*$ and associate it with probability $q_n$.

In an example embodiment, if there is a tie (i.e. more than one sequence satisfies the conditions), the tie may be broken by choosing at random any one of the selected sequences.

Constraint a) ensures that any added sequence is maximally distant from the subset of sequences that are already in the result set. Constraint b) guarantees that the added sequence is sufficiently distant from its closest sequence in the result set.

If the threshold, w, in Constraint b) is high, the obtained result set may have a cardinality strictly lower than N. If the threshold, w, in Constraint b) is relatively low, the obtained result set may not be the best in terms of collision reduction. Hence, to find a suitable threshold value, a high value for w may be used initially and decreased until a result set with cardinality N is obtained. The greatest value that satisfies this latter condition may be adopted as a threshold for Constraint b).

The above has been described with respect to URLLC services for which the traffic is sporadic. In the case of periodic traffic, the network has information about when the UE's packets are going to come, dedicated resources for the transmission of these packets may the best strategy. For some services with sporadic traffic, the network may not know some information about the traffic profile of the UE when this joins the network, such as the probability that this UE has data to transmit (i.e. activation probability). There may also be services for which the activation probability changes over time.

However, the network would at least know the type(s) of traffic to expect from a UE. It is worth noting that the already-known information about the UEs' traffic profiles may be sent, for instance, as part of the NSSAI (Network Slice Selection Assistance Information) when the UE joins the network.

The method may comprise providing an indication to at least one of the plurality of user equipments to cause the at least one user equipment to determine the activation probability of the at least one user equipment and receiving an indication of the activation probability from the at least one user equipment.

The method thus provides signaling for a gNB to obtain the set of activation probabilities for the plurality of UEs. The gNB may thus better allocate multiple UEs in a common resource.

Each UE may be involved in the determination of its activation probability if this information is not available when the UE joins the network or if it changes over time.

This provides an approach to use in order to estimate/ learn the activation probability (for each UE) in case this information is not available when establishing the URLLC session or in case it changes over time (in which case the resource allocation may be adapted to this change).

A gNB wishing to allocate a URLLC UE to network resources determines if it knows the UE's activation probability; this will depend on the use case(s) under consideration. If the UE knows the activation probability, it may be sent to the network and thus to the gNB.

If the gNB does not know the UE's activation probability when the URLLC session starts, it may provide an indication to the UE to cause the UE to determine its activation probability value. That is, a gNB signals the UE so that the latter starts collecting measurements of its activation times.

The indication may comprise a time period (or time window). The time period within which the measurements may be signalled.

Convergence sensitivity parameter "epsilon" may also be signaled by the gNB

All signaling may be in the RRC (Re)Configuration message.

In an example embodiment, while current time is less than the time window, the UE calculates the amount of time for which data transmission is caused over the time period. If the ratio converges within time window to a value (+/− "epsilon"), then the UE responds to the gNB with the ratio (the activation probability).

If the ratio does not start converging, the UE responds with an error value (to denote non-convergence).

If no convergence is achieved within the time window, gNB may trigger more measurements from the URLLC device. Alternatively, or in addition, the gNB may indicate a larger time window for the measurements and or higher sensitivity parameter epsilon to trigger more measurements from the UE.

Alternatively, or in addition, the activation probability value may be a predetermined value. For some user equipments, it may not be possible to determine the activation probability (for instance some time averages do not converge to a probability value). In the case where no activation probability exists for some devices the gNB may assume a worst case activation probability.

For example, if the gNB does not know the UE's activation probability when the URLLC session starts (which means that the UE also does not have this knowledge), then the gNB assumes that the activation probability is relatively high. In one example embodiment, the activation probability value is set to 0.1, which is considered as a high value. In other words, the gNB may be considered to make worst-case assumption regarding the activity profile of this UE.

The gNB then allocates the UE to a resource according to its knowledge of activation probability, as described above.

Figure 7:
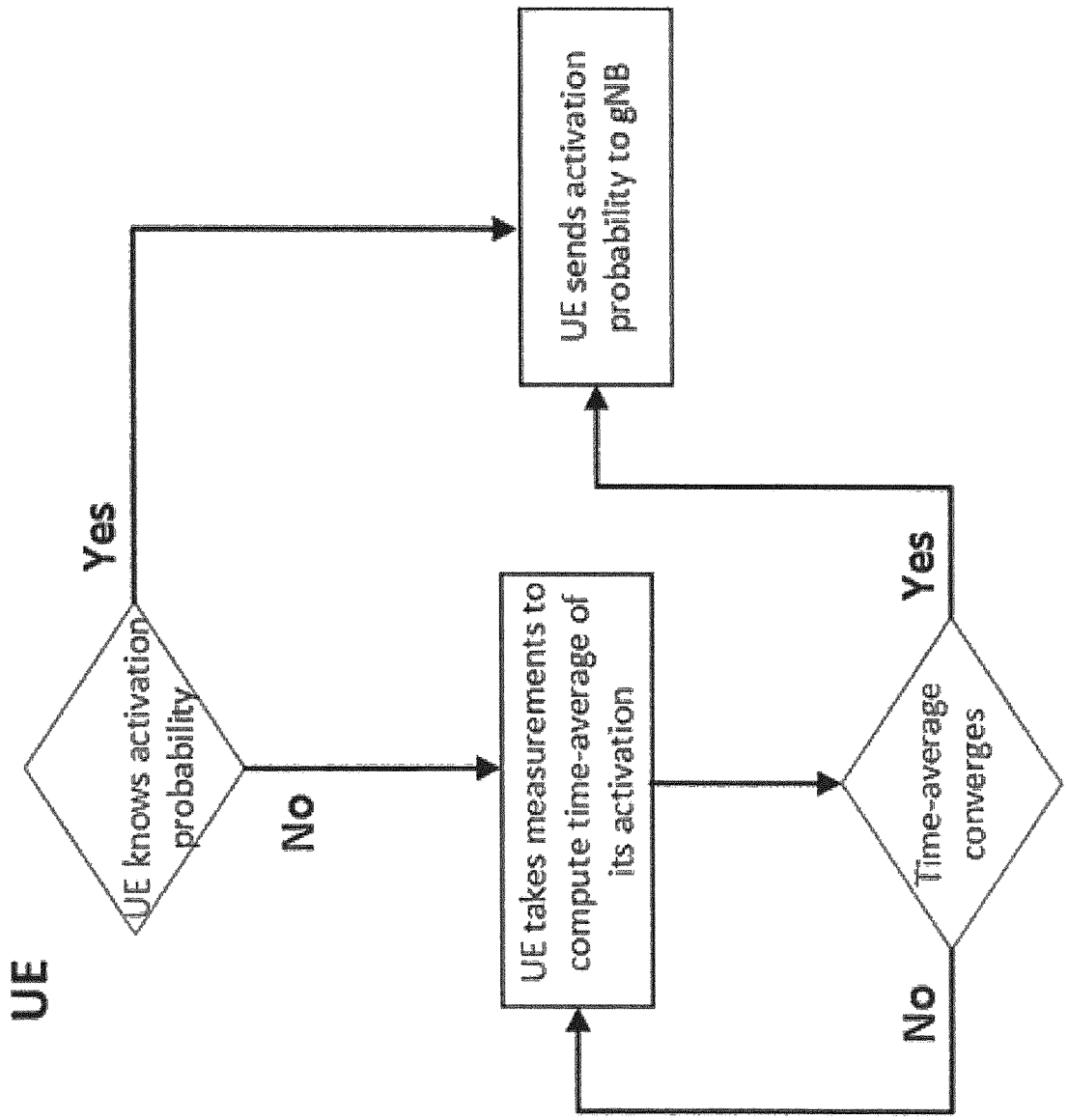
FIG. 7 shows a flowchart of a method according to an example embodiment.

FIG. 7 shows the UE side calculation of activation probability according to an example. The UE determines if it knows the activation probability. If so, the UE sends the activation probability to the gNB. If not, the UE takes measurements to compute the time-average of its activation probability. If the time-average converges, the UE sends the activation probability to the gNB. If not, the UE takes further measurements until there is convergence.

Figure 8:
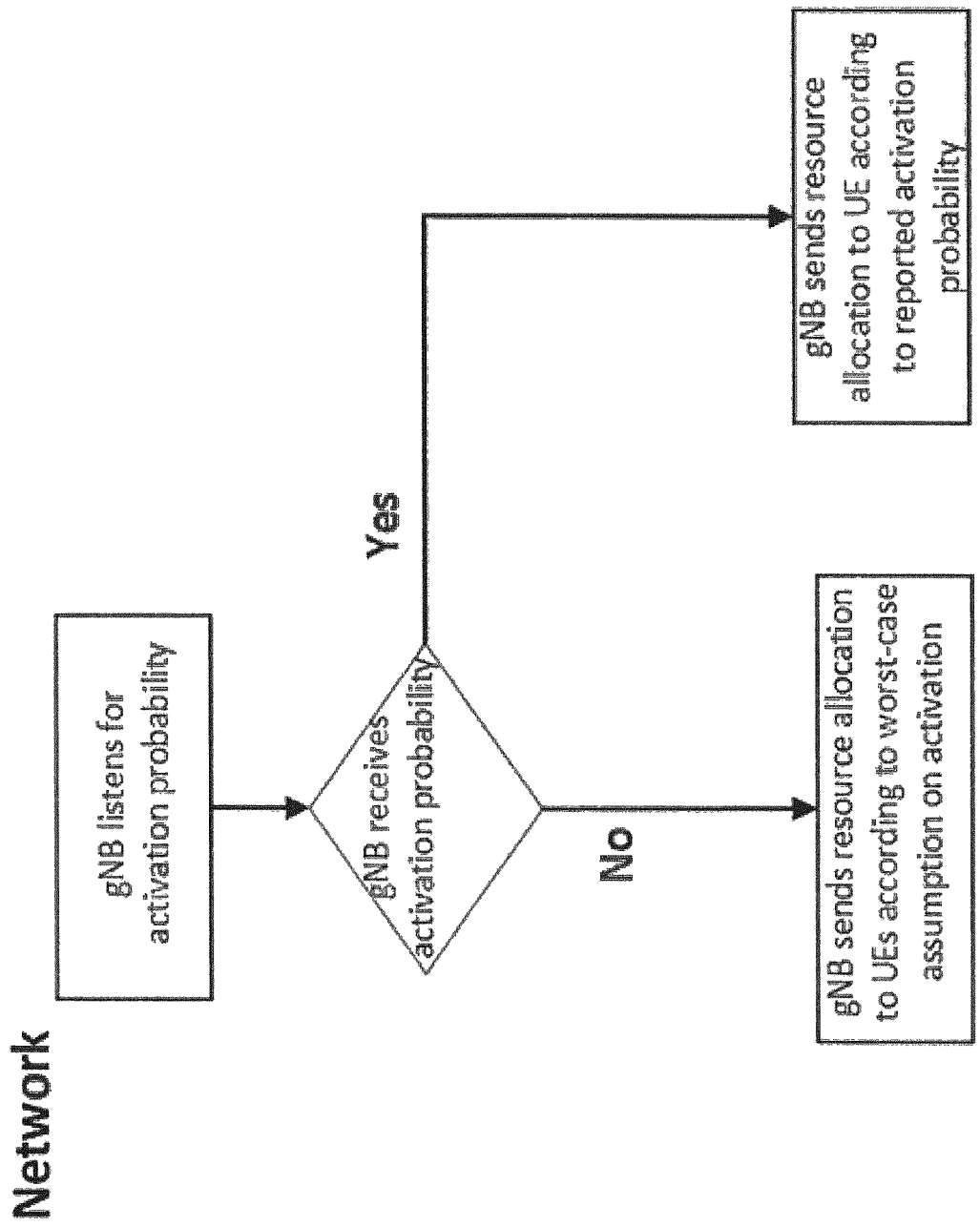
FIG. 8 shows a flowchart of a method according to an example embodiment.

FIG. 8 shows a network side flow in which the gNB listens for activation probability from a UE. If the gNB receives the activation probability it sends a resource allocation to a UE according to the reported activation probability. If not, the gNB sends a resource allocation to a UE according to a worst-case assumption on activation.

Figure 9:
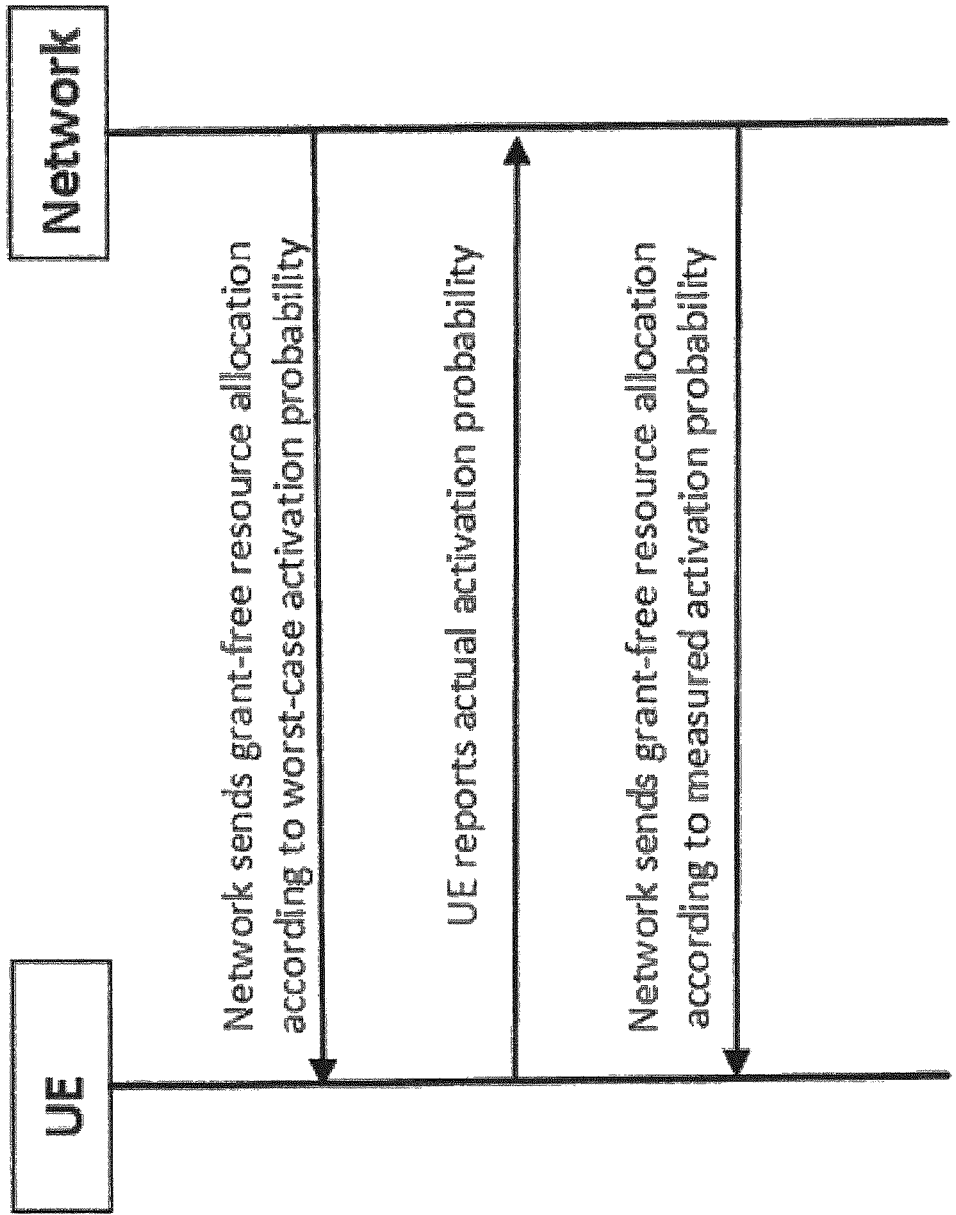
FIG. 9 shows a signalling diagram according to an example embodiment.

FIG. 9 shows a signalling flow between a UE and a gNB where the network, not knowing the activation probability of the UE, allocates resources according to the worst-case activation probability (e.g., 0.1).

The network sends grant-free resource allocation according to the worst case activation probability. The UE then reports the actual activation probability. The network then sends an updated, grant-free, resource allocation according to the measured activation probability.

In an alternative embodiment, the base station, e.g., gNB, may determine the activation probability of the UE. The gNB may not identify some of the packets sent by the UE due to collision with other UEs' packets which may lead to less accurate estimation of the activation probability or require more time to achieve an accurate estimation of the activation probability.

Methods as described above may provide an efficient strategy for allocating resources for grant-free URLLC UL transmissions which takes into account the activity profiles of the UEs. It also provides an approach to learn such profiles in case they are not available when the UEs join the network or in case they change over time.

If the gNB has knowledge of the transmission probabilities of the UEs, a more efficient resource-allocation strategy may be provided as opposed to where the gNB doesn't have this knowledge. That is, accounting for the activation probabilities in the design may make the resulting pre-assigned sequences more efficient from a collision point of view.

The resource allocation may also be adapted according to changes in the activity profile of any UE.

Using pre-assigned sequences may simplify and improve the detection of the UE identity and the received packet replicas since the gNB knows in advance the RUs each UE uses to send its replicas.

The method may be implemented in a user equipment as described with reference to FIG. 2 or a control apparatus as described with reference to FIG. 3. An apparatus may comprise means for determining for at least one of a plurality of user equipments, based on an activation probability value of some or all of the plurality of user equipments, uplink resources for use by the at least one user equipment and providing an indication of the determined uplink resources to the at least one user equipment.

Alternatively, or in addition, the apparatus may comprise means for receiving, at a user equipment in a plurality of user equipments, an indication from a base station of determined uplink resources for use by the user equipment, the uplink resources determined based on an activation probability value of some or all of the plurality of user equipments.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to 5GS and URLLC, similar principles can be applied in relation to other networks and communication systems where grant free uplink transmissions are performed. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The invention claimed is:

1. An apparatus comprising:
at least one processor and at least one non-transitory memory storing instructions, that when executed by the at least one processor, cause the apparatus at least to:
communicate with at least one of a plurality of user equipment an indication to determine an activation probability value;
based on the communicating, receive an indication of the activation probability determined at least one user equipment of the at least one of a plurality of user equipment,
determine at the apparatus the activation probability value for each or some or all of a plurality of user equipment that has data to transmit is exceeding a threshold,
wherein the activation probability is based on a probability of the user equipment causing data transmission;
based on the activation probability value determined at the apparatus of each of some or all of the plurality of user equipment, allocate uplink resources for use by the at least one user equipment;
provide an indication to user equipment of the at least one user equipment of the uplink resources allocated based on the activation probability value determined at the apparatus;
and
provide another indication to the user equipment of a subsequent resource allocation sequence update based on the activation probability determined at the user equipment from the at least one user equipment is exceeding a threshold.

2. An apparatus according to claim 1, wherein the activation probability value is a predetermined value send to the each of some or all of the plurality of user equipment, the predetermined activation probability value.

3. An apparatus according to claim 1, wherein the indication to cause the at least one user equipment to determine the activation probability of the at least one user equipment comprises a time period and the activation probability value is a ratio of a time for data transmission in the time period to the time period.

4. An apparatus according to claim 1, wherein the indication of the determined uplink resources comprises an index associated with the determined uplink resources.

5. An apparatus according to claim 1, wherein the indication of the determined uplink resources comprises time and frequency domain allocations.

6. An apparatus comprising:
- at least one processor and at least one memory storing instructions, that when executed by the at least one processor, cause the apparatus at least to:
- receive, at a user equipment in a plurality of user equipment, an indication from a base station of determined uplink resources for use by the user equipment, the uplink resources determined based on an activation probability value of some or all of the plurality of user equipment,
- wherein the activation probability value defines a probability of the user equipment causing data transmission;
- based on the indication, determine at the user equipment the activation probability of the user equipment;
- provide an indication of the determined activation probability determined at the user equipment to the base station; and
- based on the providing, receive an indication of a subsequent resource allocation sequence update based on the activation probability determined at the user equipment is exceeding a threshold.

7. An apparatus according to claim 6, wherein the activation probability value is a predetermined value.

8. An apparatus according to claim 6, wherein the indication to cause the user equipment to determine the activation probability of the user equipment comprises a time period and the activation probability value is a ratio of a time for data transmission in the time period to the time period.

9. An apparatus according to claim 6, wherein the indication of the determined uplink resources comprises an index associated with the determined uplink resources.

10. An apparatus according to claim 6, wherein the indication of the determined uplink resources comprises time and frequency domain allocations.

11. A method comprising:
- receiving, at a user equipment in a plurality of user equipment, an indication from a base station of determined uplink resources for use by the user equipment, the uplink resources determined based on an activation probability value of some or all of the plurality of user equipment,
- wherein the activation probability value defines a probability of the user equipment causing data transmission, and
- wherein the indication is a cause for the user equipment to determine an activation probability of the user equipment;
- based on the indication, determine the activation probability of the user equipment;
- provide an indication of the determined activation probability determined at the user equipment to the base station; and
- based on the providing, receive an indication of a subsequent resource allocation sequence update based on the activation probability determined at the user equipment is exceeding a threshold.

12. A method according to claim 11, wherein the activation probability value is a predetermined value.

13. A method according to claim 11, wherein the indication to cause the user equipment to determine the activation probability of the user equipment comprises a time period and the activation probability value is a ratio of a time for data transmission in the time period to the time period.

14. A method according to claim 11, wherein the indication of the determined uplink resources comprises an index associated with the determined uplink resources.

15. A method according to claim 11, wherein the indication of the determined uplink resources comprises time and frequency domain allocations.

* * * * *